United States Patent [19]

Berta

[11] Patent Number: 5,158,997
[45] Date of Patent: Oct. 27, 1992

[54] ZINC-SALTS OF CERTAIN MERCAPTO COMPOUND AND HINDERED PHENOLS IN OLEFIN POLYMER BASED THERMOPLASTIC ELASTOMERS FOR IMPROVED HEAT AGING

[75] Inventor: Dominic A. Berta, Wilmington, Del.

[73] Assignee: Himont Incorporated, Wilmington, Del.

[21] Appl. No.: 752,756

[22] Filed: Aug. 31, 1991

[51] Int. Cl.$^5$ ................................................ C08K 5/47
[52] U.S. Cl. ........................................ 524/83; 524/93; 524/291; 524/349; 524/350
[58] Field of Search .................. 524/291, 83, 93, 349, 524/350; 525/232, 240

[56] References Cited

U.S. PATENT DOCUMENTS

| | | | |
|---|---|---|---|
| 2,997,456 | 8/1961 | Mills | 524/93 |
| 3,112,300 | 11/1963 | Natta et al. | 525/240 |
| 4,036,912 | 7/1977 | Stricharczuk | 525/232 |
| 4,125,509 | 11/1978 | Vostovich | 524/291 |
| 4,260,661 | 4/1981 | Walters et al. | 428/39 |
| 4,824,883 | 4/1989 | Walters et al. | 524/350 |

FOREIGN PATENT DOCUMENTS 58-122943 7/1983 Japan .

*Primary Examiner*—Veronica P. Hoke

[57] ABSTRACT

Disclosed is an olefin polymer-based thermoplastic elastomer comprising a propylene polymer material, an amorphous olefin copolymer rubber, and optionally a semicrystalline, essentially linear ethylene-$C_{3-4}$ alpha-olefin copolymer, having incorporated therein zinc salts of certain mercapto compounds and sterically hindered di-tertiary butyl phenol compounds. The compositions exhibit good retention of properties at elevated temperatures.

7 Claims, No Drawings

ZINC-SALTS OF CERTAIN MERCAPTO COMPOUND AND HINDERED PHENOLS IN OLEFIN POLYMER BASED THERMOPLASTIC ELASTOMERS FOR IMPROVED HEAT AGING

FIELD OF THE INVENTION

This invention relates generally to high temperature aging of olefin polymer-based thermoplastic elastomers. Specifically, it relates to the combination of zinc-salts of certain mercapto compounds and sterically hindered di-tertiary butyl phenol compounds for high temperature aging of olefin polymer-based thermoplastic elastomers.

BACKGROUND OF THE INVENTION

Polyolefins and polyolefin compositions are typically used in products that are subjected to elevated temperatures which accelerate the rate of oxidation degradation in the polyolefin composition, commonly referred to as "heat aging", where long term performance is desired or required. Thus, the ability of polyolefins and compositions thereof to retain their original properties, such as elongation and tensile strength, at elevated temperatures during the desired or required term of performance is important.

Various antioxidant compounds or combinations thereof have been found to have a retarding or stabilizing effect on the "heat aging" of polyolefins and polyolefin compositions, and therefore have been widely used. For example U.S. Pat. No. 2,997,456 discloses stabilization of polyolefins against thermal degradation by incorporating metal salts of mercapto, selenide or telluride benzimidazole compounds into the polyolefins.

U.S. Pat. No. 4,036,912 discloses thermoplastic blends of ethylene-propylene or ethylene-propylene-diene polymer having a high ethylene sequence index and polypropylene. The reference teaches that antioxidants can be added.

U.S. Pat. Nos. 4,260,661 and 4,824,883 discloses using an antioxidant system comprising a combination of a zinc salt of a mercaptoimidazole with a sterically hindered di-tertiary butylphenol in polyethylene containing polymers to obtain improved heat curing stability.

Japanese Patent 58-122943 discloses a synergistic combination of antioxidants comprising a phenol, a 1,2-dihydroquinoline and an organic zinc salt, e.g. zinc salts of mercaptobenzimidazole and mercaptobenzothiazole, to improve the heat stability of polyolefins.

While the polyolefin compositions of the above-mention prior art give improved heat aging properties by incorporating antioxidants or combinations thereof, the percent retention of these original properties is still low.

SUMMARY OF THE INVENTION

The present invention relates to an olefin polymer-based thermoplastic elastomer comprising:

(A) 100 parts of a thermoplastic elastomer containing (i) 20 to 80 parts propylene polymer material, (ii) 20 to 80 parts amorphous olefin copolymer rubber which is xylene soluble at room temperature, and (iii) 0 to 30 parts semi-crystalline, essentially linear ethylene $C_{3-4}$ alpha-olefin copolymer which is xylene insoluble at room temperature, (B) 0.6 to 4 parts of a zinc salt of a mercapto compound, based on 100 parts of (A), and (C) 0.2 to 1.0 part(s) of a sterically hindered di-tertiary butyl phenol compound, based on 100 parts of (A).

More broadly this invention relates to an olefin polymer-based thermoplastic elastomer comprising:

(A) 100 parts of a thermoplastic elastomer containing (i) 10 to 90 parts propylene polymer material and (ii) 10 to 90 parts amorphous olefin copolymer rubber which is xylene soluble at room temperature, and (B) 0.6 to 4 parts of a zinc salt of a mercapto compound, based on 100 parts of (A), and (C) 0.2 to 1.0 part(s) of a sterically hindered di-tertiary butyl phenol compound, based on 100 parts of (A), wherein (A) is a mechanical blend of pre-formed components of (i) and (ii).

DETAILED DESCRIPTION OF THE INVENTION

Unless otherwise specified all parts and percentages are by weight in this specification.

The thermoplastic elastomer of component (A) contains (i) propylene polymer material, (ii) amorphous olefin copolymer rubber, and optionally, (iii) semicrystalline, essentially linear ethylene-$C_{3-4}$ alpha-olefin copolymer.

The propylene polymer material used in the present invention as component (i) includes crystalline polypropylene having an isotactic index of greater than 90%, preferably from 95 to 98%; an ethylene-propylene random copolymer having an ethylene content of up to 10%, preferably from about 1% to 4%, and an ethylene-propylene-butene-1 random terpolymer having an ethylene content of up to 10%, preferably up to 4 and a butene-1 content of up to 20%, preferably up to 16%. Preferably, the propylene polymer material is polypropylene. The propylene polymer material is present in an amount of from 20 to 80 parts, and preferably from 30 to 50 parts.

Suitable olefin copolymer rubbers used in the present invention are ethylene-propylene copolymer rubber having an ethylene content of from 30 to 70%, ethylene-butene copolymer rubber having an ethylene content of from 30 to 70%, ethylene-propylene-non-conjugated diene monomer rubber having an ethylene content of from 30 to 70% and a diene content of from 1 to 10% and ethylene-butene-non-conjugated diene monomer rubber having an ethylene content of from 30 to 70% and diene monomer of 1 to 10%. The amorphous olefin rubber is present in an amount of from 20 to 80 parts, preferably from 30 to 50 parts and is soluble in xylene at room temperature. Examples of the non-conjugated dienes include 1,4-hexadiene, ethylidene-norbornene and dicyclopentadiene.

The term "amorphous" as used herein is defined as a crystallinity of from 0 to 22%, preferably 0 to 10%, and most preferably 0 to 5%, as measured by differential scanning calorimetry (DSC).

When present, the semi-crystalline, essentially linear ethylene-$C_{3-4}$ alpha-olefin copolymer consist substantially of units of ethylene, i.e. 85 to 98%, preferably greater than 95%, and is insoluble in xylene at room temperature. The term "semi-crystalline" as used in this application is defined as a crystallinity of from about 20 to about 60%, preferably about 25 to about 50%, as measured from the heat of fusion of said ethylene-propylene copolymer or ethylene-butene copolymer, as the case may be, which is determined by differential scanning calorimetry on a 5 to 10 mg sample of the copolymer heated at 20° C./min. and assuming the heat fusion of 100% crystalline polyethylene at 400° K. is 293 J/g as described in U. Gaur and B. Wunderlich, J. Phys. Chem. Ref. Data, 10 (1), 119 (1981). The percent crystallinity is calculated by dividing the heat of fusion of the copolymer by the heat of fusion of 100% crystalline polyethylene and multiplying by 100. Said ethylene-$C_{3-4}$ alpha-olefin copolymer may be present in amounts of up to 30 parts, and preferably 10 to 20 parts.

The zinc salt of a mercapto compound used in the composition of the present invention can be a zinc 2-mercaptobenzothiazole, zinc 2-mercaptobenzimidazole or a zinc 2-mercaptotoluimidazole. The zinc salt is present in an amount of from 0.6 to 4 parts, preferably from 1.4 to 3 parts, based on 100 parts of (A).

Suitable sterically hindered di-tertiary butyl phenol compounds use in the present invention include 2,6-di-t-bu; l-p-cresol, octadecyl-3-(3,5-di-t-butyl-4-hydroxyphenyl) propionate, N.N'-hexamethylene bis(3,5-di-t-butyl-4-hydroxy-hydrocinnamate), hexamethylene bis(3,5-di-t-butyl-4-hydroxy-hydrocinnamate), and tetrakis[methylene(3',5'-di-t-butyl-4-hydroxy-hydrocinnamate]methane. The sterically hindered phenol compounds are present in an amount of from 0.2 to 1.0 parts, based on 100 parts of (A).

The olefin polymer-based thermoplastic elastomer of the present invention is prepared by blending components (i) and (ii), and adding thereto the zinc salt of a mercapto compound and the sterically hindered di-tertiary butyl phenol compound. The components are then melt blended until a homogenous mixture is obtained.

When the olefin polymer-based thermoplastic elastomer contains component (iii), components (i), (ii), and (iii) are formed in a reactor or series of reactors in at least two stages by first polymerizing the relevant monomer or monomers to form component (i) and then polymerizing a $C_3$ or $C_4$ alpha-olefin and ethylene, and optionally, a diene monomer in the presence of component (i) to form components (ii) and (iii) in liquid or gas phase or in liquid-gas phase in at least two stages. In the alternative, components (i), (ii), and (iii) can each be prepared separately and then mixed by melt-kneading.

In preparing the thermoplastic elastomer of the present invention, a homogeneous reactor blend or composition of components (i), (ii) and (iii) is prepared in two stages as described above, wherein the first stage is in liquid propylene and the second stage is in gas phase using a catalyst and procedure as set forth in U.S. Ser. No. 515,936, filed Apr. 27, 1990, the disclosures of which are incorporated herein by reference. The resultant reactor composition is then mixed with the zinc salt of the mercapto compound and the hindered phenol compound, and mixing is continued an additional 1 to 3 minutes until a homogeneous mixture is obtained.

The melt blending or mixing of (A), (B) and (C) as defined above, of the present invention can be carried out on an open roll, in an internal mixer (e.g., Banbury or Haake mixers), and single-screw or twin-screw extruders.

The thermoplastic elastomer of the present invention may also contain other conventional additives, for example, extender oils, such as paraffinic and naphthenic oils; fillers, such as $CaCo_3$, talc and zinc oxide; or flame retardants.

The present invention will be illustrated in greater detail with reference to the examples of the invention set forth below. The test samples and physical properties of the following working examples and comparative examples were prepared and measured according to the following methods:

| Tensile Strength | ASTM D-412 |
| Break Elongation | ASTM D-412 |
| 100% Modulus | ASTM D-412 |
| Shore D Hardness | ASTM D-2240 |

EXAMPLE 1

To 100 parts of a thermoplastic elastomer, Hifax RA063 resin having 40 parts crystalline polypropylene having an isotactic index of about 92%, about 40 parts of ethylene-propylene copolymer rubber having an ethylene content of about 50%, and 20 parts semi-crystalline, essentially linear ethylene-propylene copolymer which is insoluble in xylene at room temperature and has an ethylene content of 96%, prepared in a reactor as described herein above, in a Henschel mill is added 2 parts zinc 2-mercaptobenzothiazole and 0.6 parts tetrakis[methylene-(3',5'-di-t-butyl-4'-hydroxy-hydrocinnamate)]methane. The ingredients were tumble blended for approximately 15 to 30 seconds, then charged to a Haake internal mixing head (Model 3000E) preset at 200° C., and mixed at 100 rpm for approximately 2 to 3 minutes at said temperature. Mixing was continued for an additional two minutes until a homogeneous mixture is obtained.

The mixture was then transferred onto compression mold bottom plattens, covered with top plattens and compression molded at 215° C. for 3 minutes at 10 MPa. The mold was cooled down and the plaques were removed for testing.

The physical properties are set forth in Table 1.

EXAMPLE 2

Example 2 is prepared according to the procedure and ingredients of Example 1 except that 2 parts of zinc 2-mercaptotoluimidazole is used instead of 2 parts of zinc 2-mercaptobenzothiazole. The physical properties are set forth in Table 1.

Control 1

Control 1 was prepared according to the procedure and ingredients of Example 1 except that no zinc 2-mercaptobenzothiazole was used. The physical properties are set forth in Table 1.

Control 2

Control 2 was prepared according to the procedure and ingredients of Example 1 except that 0.6 parts 4,4'-thiobis(6-butyl-m-cresol) was used instead of tetrakis[methylene-(3',5'-di-t-butyl-4'-hydroxy-hydrocinnamate)]methane. The physical properties are set forth in Table 1.

Control 3

Control 3 was prepared according to the procedure and ingredients of Example 1 except that 0.6 parts Sandostab PEP-Q stabilizer was used instead of tetrakis[methylene-(3',5'-di-t-butyl-4'-hydroxy-hydrocinnamate)]methane. The physical properties are set forth in Table 1.

Control 4

Control 4 was prepared according to the procedure and ingredients of Example 1 except that no tetrakis[- methylene-(3',5'-di-t-butyl-4'-hydroxy-hydrocinnamate)]methane was used. The physical properties are set forth in Table 1.

Control 5

Control 5 was prepared according to the procedure and ingredients of Example 2 except that no tetrakis[methylene-(3',5'-di-t-butyl-4'-hydroxy-hydrocinnamate)]methane was used.

4'-hydroxy-hydrocinnamate)]methane was used. The physical properties are set forth in Table 2.

EXAMPLE 4

The procedure and ingredients of Example 3 except that zinc 2-mercapto-benzothiazole was used instead of zinc 2-mercaptotoluimidazole. The physical properties are set forth in Table 2.

TABLE 1

|  | Ex. 1 | Ex. 2 | C-1 | C-2 | C-3 | C-4 | C-5 |
|---|---|---|---|---|---|---|---|
| Ingredients |  |  |  |  |  |  |  |
| Hifax RA-063 resin | 100 | 100 | 100 | 100 | 100 | 100 | 100 |
| Irganox 1010[1] | 0.6 | 0.6 | 0.6 | — | — | — | — |
| Santanox R[2] | — | — | — | 0.6 | — | — | — |
| Zetax[3] | 2.0 | — | — | 2.0 | 2.0 | 2.0 | — |
| Sandostab P-EPQ[4] | — | — | — | — | 0.6 | — | — |
| ZMTI[5] | — | 2.0 | — | — | — | — | 2.0 |
| Orig. Properties |  |  |  |  |  |  |  |
| 100% Modulus, psi | 1040 | 1060 | 1120 | 870 | 751 | 960 | 1100 |
| Tensile Strength, psi | 1090 | 1035 | 1270 | 960 | 860 | 1000 | 1125 |
| Elongation, % | 260 | 250 | 360 | 320 | 330 | 370 | 300 |
| Shore D | 35 | 37 | 35 | 33 | 32 | 36 | 37 |
| Air Aging @ 165° C./7 days |  |  |  |  |  |  |  |
| 100% Modulus, psi | 1020 | 980 | 1060 | — | — | — | — |
| % Retention | 98 | 95 | 94 | — | — | — | — |
| Tensile Strength, psi | 1025 | 1000 | 1070 | 760 | 720 | 800 | 790 |
| % Retention | 94 | 97 | 84 | 79 | 84 | 80 | 68 |
| Elongation, % | 130 | 180 | 140 | 36 | 24 | 30 | 17 |
| % Retention | 50 | 72 | 39 | 11 | 7 | 8 | 6 |
| Shore D | 32 | 36 | 31 | 31 | 31 | 29 | 34 |
| Air Aging @ 165° C./14 days |  |  |  |  |  |  |  |
| 100% Modulus, psi | 1030 | 1200 | — | — | — | — | — |
| % Retention | 99 | 112 | — | — | — | — | — |
| Tensile Strength, psi | 1035 | 1190 | 1010 | — | — | 950 | 930 |
| % Retention | 95 | 115 | 79 | — | — | 95 | 83 |
| Elongation, % | 140 | 160 | 78 | — | — | 25 | 20 |
| % Retention | 52 | 64 | 22 | — | — | 7 | 7 |
| Shore D | 34 | 36 | 32 | — | — | 30 | 34 |

[1] Tetrakis[methylene(3,5-di-tert-butyl-4-hydroxy-hydrocinnamate)]methane, commercially available.
[2] 4,4'-thio-bis-(6-tert-butyl-m-cresol), commercially available.
[3] Zinc salt of 2-mercaptobenzothiazole, commercially available.
[4] A stabilizer composition of which the main component is tetrakis(2,4-di-tert-butylphenyl)-4,4'-bisphenylene diphosphonite, commercially available.
[5] Zinc salt of 2 mercaptotoluimidazole, commercially available.

As demonstrated in Table 1, the compositions of Examples 1 and 2 containing the zinc mercapto salts of the invention retained at least 50% or better of all original properties at 165° C. for 7 and 14 days, as compared to the Controls which retained 50% or better of only the tensile strength.

EXAMPLE 3

The procedure and ingredients were the same as in Example 1, except that 40 parts of crystalline polypropylene having a melt flow rate of 4.0 dg/min, 60 parts of Dutral 038 ethylene-propylene copolymer rubber having an ethylene content of 70%, a Mooney viscosity (ML(1+4) @121° C.) and density of 0.865 g/cm³ were used instead of Hifax RA063 resin and 2 parts of zinc 2-mercaptotoluimidazole was used instead of zinc 2-mercaptobenzothiazole. The physical properties are set forth in Table 2.

Control 6

The procedure and ingredients of Example 3 were used except that no zinc salt of a mercapto compound was used. The physical properties are set forth in Table 2.

Control 7

The procedure and ingredients of Example 3 were used except that no tetrakis[methylene(3',5'-di-t-butyl- Control 8

The procedure and ingredients of Example 4 were used except that no tetrakis[methylene]3',5'-di-t-butyl-4'-hydroxy-hydrocinnamate)]methane was used. The physical properties are set forth in Table 2.

TABLE 2

|  | Ex. 3 | Ex. 4 | C-6 | C-7 | C-8 |
|---|---|---|---|---|---|
| Ingredients |  |  |  |  |  |
| Pro-fax 6501 | 40 | 40 | 40 | 40 | 40 |
| Dutral 038 | 60 | 60 | 60 | 60 | 60 |
| ZMTI | 2 | — | — | 2 | — |
| Zetax | — | 2 | — | — | 2 |
| Irganox 1010 | 0.6 | 0.6 | 0.6 | — | — |
| Original Properties |  |  |  |  |  |
| 100% Modulus, psi | 1180 | 1170 | 1280 | 1330 | 1240 |
| Tensile Strength, psi | 1184 | 1180 | 1170 | 1320 | 1250 |
| Elongation % | 260 | 280 | 220 | 240 | 220 |
| Shore D | 41 | 43 | 39 | 41 | 40 |
| Air Aging @ 165° C./7 days |  |  |  |  |  |
| 100% Modulus, psi | 1140 | 1260 | 1130 | — | — |
| % Retention | 97 | 108 | 88 | — | — |
| Tensile Strength, psi | 1160 | 1280 | 1140 | 960 | 870 |
| % Retention | 98 | 108 | 97 | 70 | 62 |
| Elongation, % | 200 | 220 | 190 | 14 | 18 |
| % Retention | 78 | 79 | 86 | 6 | 8 |
| Shore D | 44 | 43 | 39 | 36 | 38 |
| Air Aging @ 165° C./14 days |  |  |  |  |  |
| 100% Modulus, psi | 1170 | 1260 | 1050 | — | — |

TABLE 2-continued

|  | Ex. 3 | Ex. 4 | C-6 | C-7 | C-8 |
| --- | --- | --- | --- | --- | --- |
| % Retention | 99 | 108 | 82 | — | — |
| Tensile Strength, psi | 1140 | 1240 | 1080 | 610 | 620 |
| % Retention | 96 | 105 | 92 | 46 | 49 |
| Elongation, % | 290 | 205 | 100 | 7 | 5 |
| % Retention | 112 | 73 | 36 | 3 | 2 |
| Shore D | 40 | 42 | 36 | 34 | 32 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. An olefin polymer-based thermoplastic elastomer consisting essentially of, by weight,
   (A) 100 parts of a thermoplastic elastomer containing (i) 20 to 80 parts propylene polymer material, (ii) 20 to 80 parts amorphous olefin copolymer rubber and (iii) 0 to 30 parts semi-crystalline, essentially linear ethylene-$C_{3-4}$ alpha-olefin copolymer which is xylene insoluble at room temperature,
   (B) 0.6 to 4 parts of zinc 2-mercaptobenzothiazole, based on 100 parts of (A), and
   (C) 0.2 to 1 parts(s) of a sterically hindered phenol compound, based on 100 parts of (A).

2. The thermoplastic elastomer of claim 1, wherein (A) (ii) is an amorphous ethylene-propylene copolymer rubber containing 30 to 70% ethylene.

3. The thermoplastic elastomer of claim 1, wherein (A) (ii) is an amorphous ethylene-propylene-non-conjugated diene monomer rubber containing an ethylene content of 30 to 70% and a diene content of 1 to 5%.

4. The thermoplastic elastomer of claim 1, wherein (A) (iii) is present in an amount of from 10 to 20 parts of semi-crystalline, essentially linear ethylene-propylene copolymer.

5. The thermoplastic elastomer of claim 1, comprising 40 parts polypropylene, 40 parts crystalline amorphous ethylene-propylene copolymer rubber and 20 parts semi-crystalline, essentially linear ethylene-propylene copolymer.

6. The thermoplastic elastomer of claim 1, comprising 40 parts crystalline polypropylene, 40 parts amorphous ethylene-propylene copolymer rubber and 20 parts semi-crystalline, essentially linear ethylene-propylene copolymer.

7. An olefin polymer-based thermoplastic elastomer consisting essentially of, by weight,
   (A) 100 parts of a thermoplastic elastomer containing (i) 10 to 90 parts propylene polymer material and (ii) 90 to 10 parts amorphous olefin copolymer rubber, and
   (B) 0.6 to 4 parts of zinc 2-mercaptobenzothiazole, based on 100 parts of (A), and
   (C) 0.2 to 1 parts(s) of a sterically hindered phenol compound, based on 100 parts of (A), wherein (A) is a mechanical blend of pre-formed components of (i) and (ii).

* * * * *